Sept. 19, 1961 P. G. MARIE 3,001,193
CIRCULARLY POLARIZED ANTENNA SYSTEM
Filed March 13, 1957 4 Sheets-Sheet 1

First Receiver
Transmitter
Second Receiver

Inventor
PIERRE G. MARIE
BY
Attorney

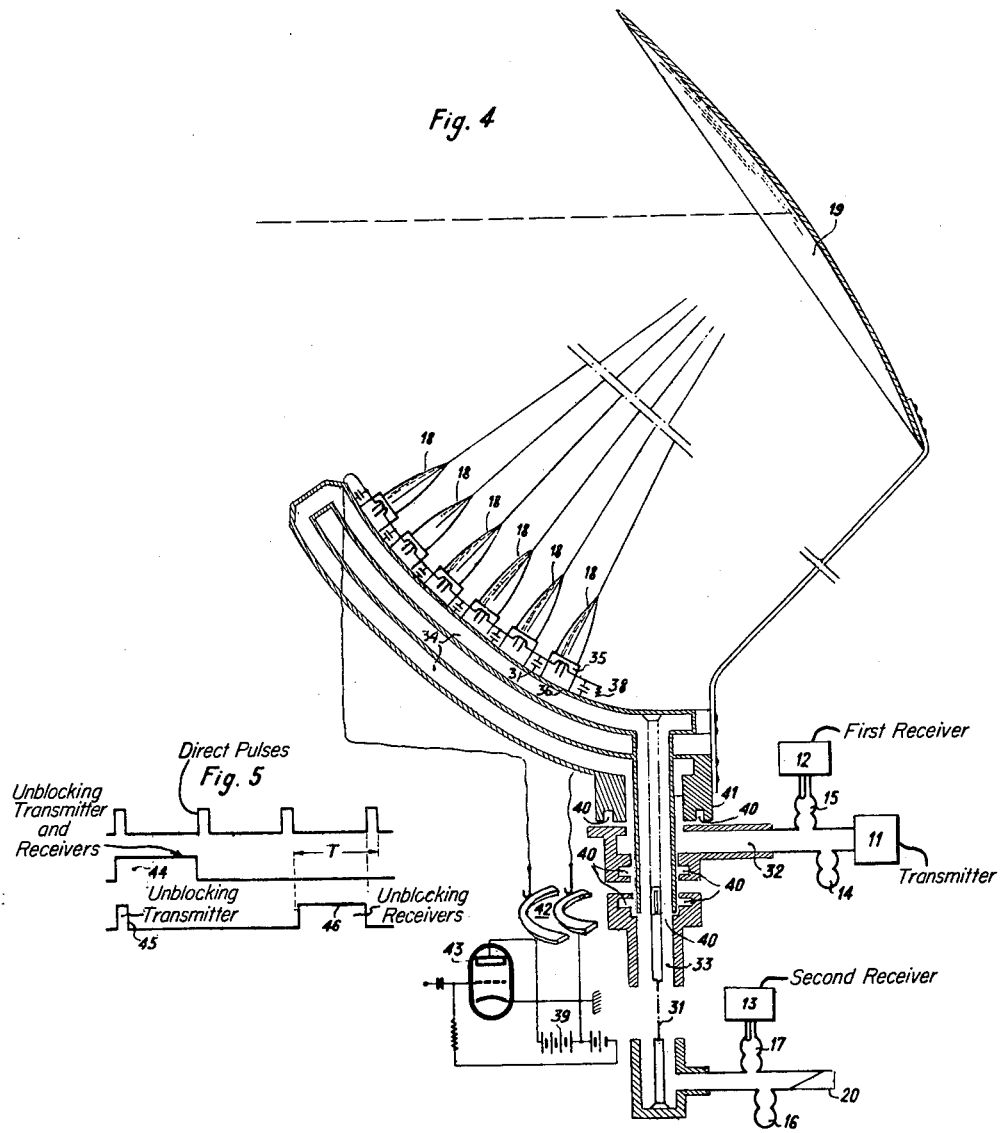

Sept. 19, 1961 P. G. MARIE 3,001,193
CIRCULARLY POLARIZED ANTENNA SYSTEM
Filed March 13, 1957 4 Sheets-Sheet 4

Inventor
PIERRE G. MARIE
By Otto John Munz
Attorney

3,001,193
CIRCULARLY POLARIZED ANTENNA SYSTEM
Pierre G. Marie, 16 Rue de Varize, Paris, France
Filed Mar. 13, 1957, Ser. No. 645,773
Claims priority, application France Mar. 16, 1956
5 Claims. (Cl. 343—100)

This invention relates to apparatus for simultaneously transmitting and receiving electromagnetic circularly polarized waves and for discriminating between them according to the direction of rotation of their electric fields.

More specifically this invention relates to a radar or communication transmitter-receiver set which transmits, towards a target or a radio communication station, pulses or signals of circularly-polarized electromagnetic wave energy and, on reception, separates the received signals having a circular polarization of the same direction as the transmitted pulses or signals from those having, at least partially, a circular polarization of the opposite direction.

Taking, for example, the problem of radar apparatus, if a circularly-polarised wave is reflected by an isotropic obstacle in relation to the axis of propagation of the wave, it returns with the same direction of circular polarization that it had on starting (the direction of rotatoin of the fields considered being that which is seen on facing the target) and the radar set of the invention switches it towards a first receiver. If, on the other hand, the same circularly-polarized wave is reflected by an anisotropic obstacle, it returns with an elliptical or rectilinear polarization which may be considered as the combination of two circularly-polarized waves with opposite directions of rotation. In this case, the radar set switches it partially towards the first receiver and partially towards a second receiver. On observing the indicators of the two receivers, it is therefore possible to decide on the isotropy of the anisotropy of the target. A cloud of spherical drops of water, for example, is an isotropic target which will give rise to an echo (clutter) on a single one of the indicators. An aircraft, which reflects the wave on its wing-leading edge is an anisotropic target which will give rise to echoes on the two indicators.

Taking, for example, the problem of radio-communications between two stations in the direct and return directions in a single frequency channel, sometimes called "diplex communications," the present invention provides for the discrimination of circularly polarized signal carrier waves according to the direction of rotation of their electric fields. In this case, there is only one receiver which is equivalent to the second receiver of the former case.

The invention uses (1) between the transmitter and the first receiver, (2) the second receiver and (3) a circularly-polarized antenna, a filtering circular polarization directional coupler of the type described in the specification of application No. 593,886, filed June 26, 1956, by the same applicant, now United States Patent No. 2,939,093, issued May 31, 1960. These filtering circular polarization directional couplers comprise essentially a rectangular wave guide and a circular wave-guide stub comprising at least one cylindrical cavity resonator and coupled to the latter through a slot system. The coupler is such that a wave, having as its frequency the cavity-resonator frequency and travelling in the rectangular wave-guide in a given direction, gives rise to a circularly-polarized wave rotating in a given direction in the circular wave-guide, whilst a wave of the same frequency travelling in the opposite direction in the rectangular wave-guide gives rise to a circularly-polarized wave rotating in the opposite direction in the circular wave-guide. Conversely, a circularly-polarized wave rotating in the circular guide in a given direction gives rise to a wave in the rectangular guide which travels towards a particular end of the said rectangular guide. In brief, it may be said that, to a given direction of rotation of the circularly-polarized wave in the circular guide, there corresponds a wave issuing from the rectangular guide or entering this guide through a given end.

The filtering circular polarization directional coupler is connected, by a side of the rectangular guide to the transmitter and to the first receiver, by the second side of the rectangular guide to the second receiver and by the circular guide to the circularly-polarized antenna. In order not to have to pick up from two space quadrature pick-up points in the circular guide the energy of the circularly polarized wave and to apply it to two space quadrature feed points in the antenna, the antenna is chosen of the dielectric rod type. The dielectric rod is fitted into the mouth of the circular guide, just above the cavity-resonator included in the guide.

Such a coupler behaves as the combination of a hybrid junction and a 90 degrees phase-shifter. One pair of symmetrical terminal points of the junction are the two mouths of the rectangular guide. The two other symmetrical terminal points are confused in a single one which is the mouth of the circular guide, one of said last terminal points being associated with a circularly polarized wave having a given direction of rotation and the second with the circularly polarized wave having the reverse direction of rotation. Further, whereas in a conventional hybrid junction the two waves emerging from the two terminals of one pair of symmetrical terminals are cophasal when energy is fed to one of the other pair of symmetrical terminals, in the coupler concerned, these two waves are in 90 degrees time phase relation. Furthermore the coupler behaves as a filter due to the cavity-resonator which it comprises.

On the other hand, it is known to render the aforesaid directional couplers non-reciprocal by arranging, in the axis of the cavity-resonator included in the circular guide, cores of ferrite which are subjected to the action of a magnetic field. Such a means allows the cavity-resonator to be detuned for a circularly polarized standing wave having a given direction of rotation in the cavity-resonator. By duplicating the cavity-resonators with ferrite cores or by giving to said cores a particular shape, it becomes possible to stop the propagation along the circular guide of the circularly polarized waves of both directions of rotation. These non-reciprocal couplers are used in the invention for the purpose of blocking and unblocking in succession a plurality of dielectric rodantennae which are coupled to the same rectangular guide by a plurality of circular guides and for decoupling the transmitted and received waves in a diplex antenna system.

The invention will be better understood with the aid of the description of the accompanying drawings.

FIG. 4 shows a radar antenna according to the invention, the beam of which is scanned in elevation by purely electromagnetic means;

Figure 3:
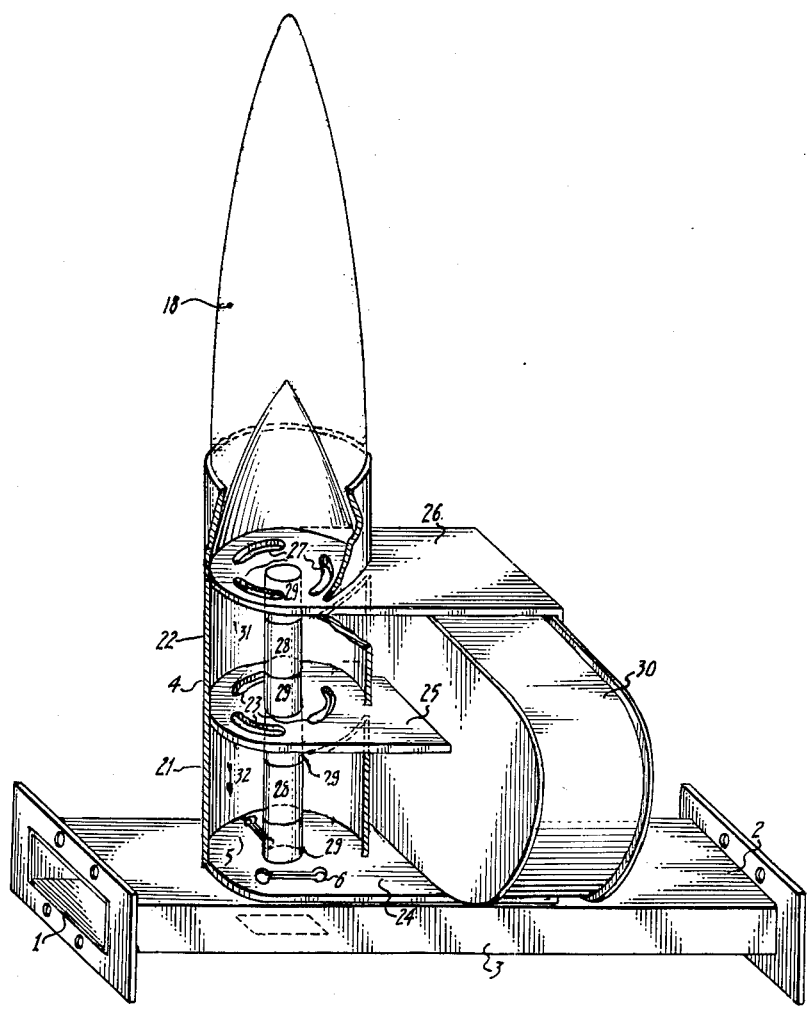
FIG. 3 shows the details of a system for coupling a radiator to the transmitter and to the receivers of a radar through the intermediary of a coupler which is blocked with the aid of a magnetic field acting on ferrites.
Figure 6:
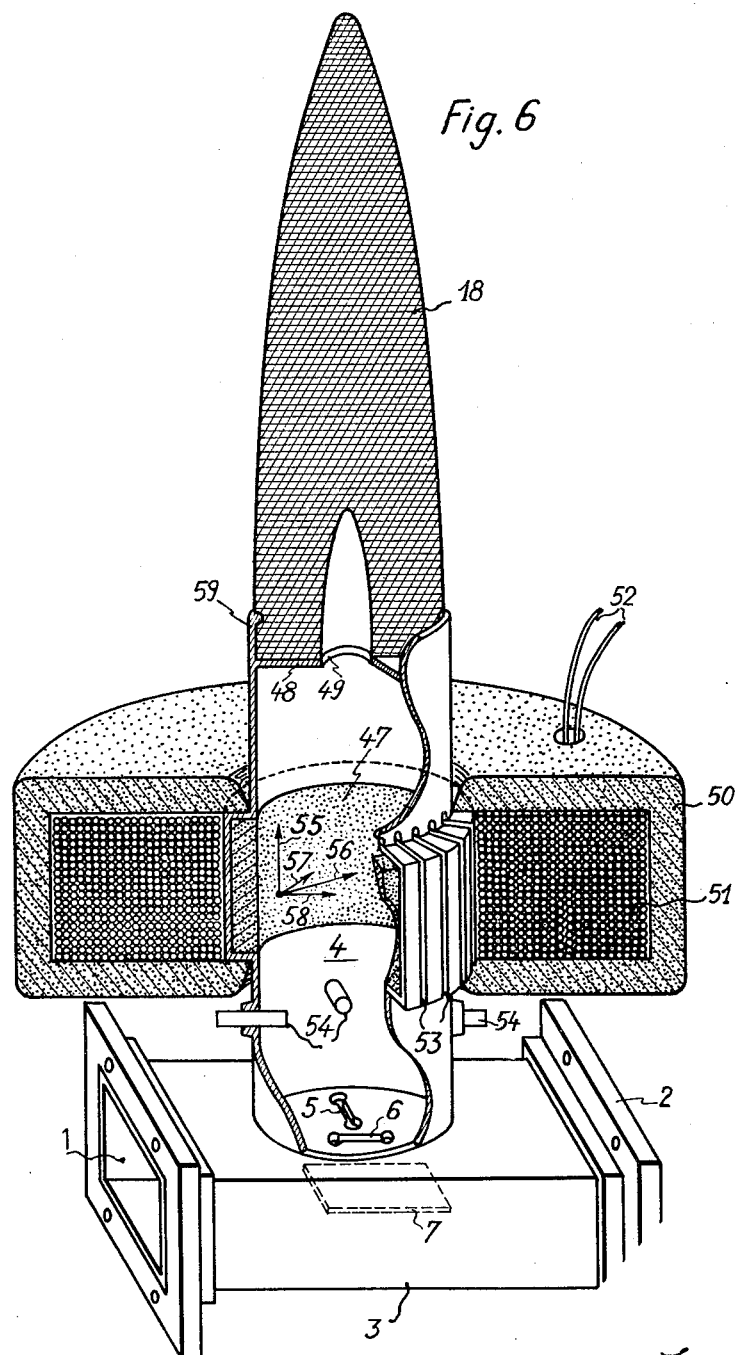

FIG. 5 gives the shape of the signals at certain points in the radar control circuits; and FIG. 6 represents a modification of the coupling system of a radiator represented in FIG. 3.

Figure 1:
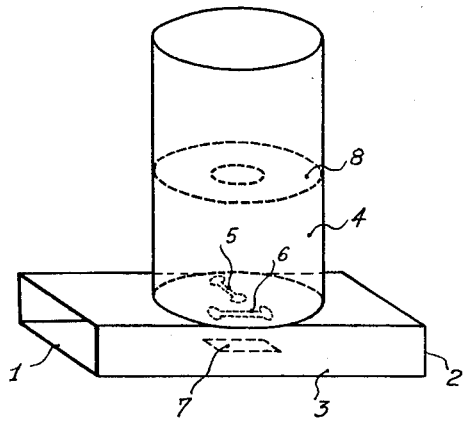
FIG. 1 represents a known filtering circular polarization directional coupler of the prior art.

The structure and the operation of a filtering circular polarization directional coupler of the type of the aforesaid patent application are recalled in relation to FIG. 1.

In this figure, 1 and 2 represent the openings of a stub of a rectangular guide 3, 4 is a circular guide, the axis of which is perpendicular to the large side of the guide 3 and which is centered on this large side, 5 and 6 are coupling slots between the circular guide and the rectangular guide and 7 is an impedance-matching paddle. The positions of the slots and of the paddle are specified in the aforesaid United States patent which will be referred to.

As these positions are conveniently determined, the result is that, when a wave of intensity $T_1$ enters through the opening 1 of the rectangular guide 3, a wave of intensity $T_2$ issues into the circular guide 4 and a wave of intensity $R_2$ issues through the opening 2 of the rectangular guide. Between the intensities $T_1$, $T_2$ and $R_2$, we have the same relationships as between the intensities respectively incident onto, transmitted and reflected by a lossless semi-reflector, so that, if an iris 8 of suitable admittance delimiting with the bottom of the circular guide a cavity-resonator, is arranged in the circular guide 4, it is possible to eliminate the intensity $R_2$ of the wave issuing from the opening 2. In this case, the whole of the energy having the same frequency as the resonance frequency of the cavity-resonator, which enters through the opening 1 of the rectangular guide passes into the circular guide in the form of a circularly-polarized wave rotating in a certain direction.

No energy is transmitted towards the opening 2, nor is any energy reflected towards the opening 1. If, in the course of its travel in the circular guide the wave meets an obstacle, it is partially reflected by the said obstacle and if, in addition, the said obstacle is perfectly isotropic in relation to the axis of the guide, the reflected energy gives rise to a circularly-polarized wave which rotates in the same direction as the incident wave.

The reflected wave, after having again travelled through the filtering circular polarization directional coupler, appears at the opening 2 of the rectangular guide.

If the obstacle met is anisotropic and is constituted, by, for example, a wire stretched across the circular guide, the reflected wave is polarized rectilinearly. Now, it is known that a rectilinearly-polarized wave can be decomposed into two circularly-polarized waves rotating in opposite directions; the result of this is that the particular one of these waves, the electric field of which rotates in the same direction as that of the electric field of the incident wave, has its energy switched towards the opening 2 of the rectangular guide, whereas the wave, the electric field of which rotates in the direction opposite to that of the electric field of the incident wave, has its energy switched towards the opening 1 of the rectangular guide.

The properties which have just been set forth remain unchanged if the wave is transmitted into free space by a properly notched dielectric rod fitted into circular guide which, having the symmetry of revolution about the axis of said guide, retains the circular polarization of the wave and if the obstacle, instead of being located in the circular guide, is located in free space.

Figure 2:
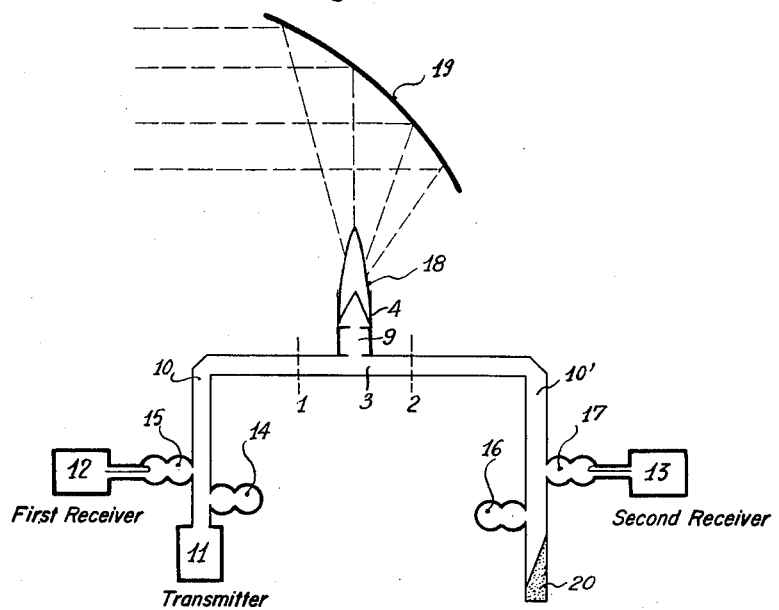
FIG. 2 is a simplified diagram of a radar according to the invention.

FIG. 2 gives a very simplified diagram of the radar apparatus forming the subject matter of the invention.

In this figure, 4 denotes the circular guide including a cavity-resonator 9 and 3 denotes the rectangular guide, the openings 1 and 2 of which are connected to two guides 10 and 10′ respectively. A transmitting magnetron 11 is connected to the guide 10, 12 and 13 are two receivers, 14, 15, 16 and 17 are T-R and anti-T-R devices, 18 is an antenna of the dielectric-rod type, 19 is a parabolic mirror and 20 is a dissipative load. The properties which have been explained in the case of FIG. 1 are again verified in the case of the radar of FIG. 2.

The echoes produced by isotropic obstacles in relation to the axis of radiation are switched towards the guide 10′ and are directed towards the receiver 13.

The echoes due to non-isotropic obstacles are switched partially towards the guide 10 and, from there, towards the recever 12. It is therefore possible, by comparing the echoes received by the two receivers 12 and 13, to see whether we are concerned with an isotropic target or not. Moreover, this new radar device does not have the drawbacks of the radars in which the polarization of the waves is linear.

In fact, for the latter, the echoes returned have intensities which vary with the direction of the polarization of the waves in relation to the target and there results therefrom a modulation of the received signal to a frequency which is double that at which the transmitting antenna rotates.

In FIGURE 2, there is only one cavity-resonator, but it is possible to produce a more efficient filtering device by arranging a plurality of cavity resonators in cascade. The coupling of these cavities is achieved by circular irises or by irises provided with slots having an axis of repetition of an order which is at least equal to three, in order that the circular polarization of the waves be retained.

It is known that, by introducing into a cavity resonator, which is resonating in circular polarization, cylindrical ferrite cores energized by a constant axial magnetic field, the resonant frequency of the cavity resonator is changed in a manner which differs according to the direction of rotation of the electromagnetic field. The mistuning of the cavity-resonator is really considerable only for the circularly-polarized wave, the field of which rotates in the same direction as the movement of precession of the uncompensated spin electrons which are present in the ferrite; the said direction is imposed by the direction of the constant axial magnetic field.

The present invention provides for the utilization of these non-reciprocal couplers for blocking or unblocking the energization of the dielectric-rod antenna such as 18 (FIG. 2). However, it should be pointed out that, in order to effect a blocking of the waves in both directions, it is necessary to use two cavities in which the constant magnetic fields have opposite directions. FIG. 3 illustrates such a device.

In FIG. 3, 1 and 2 are the openings of the rectangular guide 3 which, as in the case of FIG. 2, communicate respectively with the transmitter 11 and the receiver 12 through the guide 10 and with the receiver 13 through the guide 10′.

The circular guide 4 is divided into two cavity resonators 21 and 22. The cavity 21 is coupled to the rectangular guide through coupling slots 5 and 6. The resonant cavity 22 is coupled to the cavity 21 through three coupling holes 23; the latter are identical and are arranged in such a manner that the plate 25 in which they are made has an axis of repetition of the order of three. It is, in fact, to be borne in mind that, in order to retain the circular polarization, it is necessary that the coupling of the cavities should have an axis of repetition at least equal to three.

The cavity 22 radiates into the antenna rod 18 through the intermediary of three slots 27 made in the plate 26. Four cylinders 29 of ferrite, which are placed at the two ends of the two resonant cavities 21 and 22, are thus situated in the regions in which the microwave magnetic field is at the maximum.

Two cylinders 28, of soft iron or of a metal having a high magnetic permeability, are each arranged at the centre of a cavity in a zone in which the microwave electric field is at the maximum. The losses are thus reduced to a minimum since the losses by hysteresis which are due to the variable magnetic field are produced in the ferrite and the losses by conduction, which are due to the variable electric field are produced in the soft iron.

The plates 24, 25 and 26, which limit the cavities 21 and 22 and in which the holes 5 and 6, 23 and 27 are made respectively, are constituted by a metal having a high magnetic permeability. The said plates extend to the outside of the cavities so as to form a closed magnetic circuit.

The constant magnetic field is produced by a coil 30 which is crossed, at its middle, by the plate 25. When a direct current passes through the coil 30, the magnetic fields applied to the ferrite cylinders 29, which are placed in the cavities 21 and 22, are equal but in opposite directions.

The directions of these fields are shown by the arrows 31 and 32.

When a current passes through the coil 30, the radiator 18 is entirely cut off from the guide 3. When no current passes through the coil 30, the radiator 18 is coupled to the guide 3. In fact, when the current is present in the coil, the movements of precession of the electrons in the ferrite cylinders 29 of the cavities 21 and 22 take place in opposite directions and one of the cavities is mistuned. In order to fix one's ideas, it will be supposed that it is the electrons of the ferrites of the cavity 21 which have a movement of precession of the same direction as the direction of rotation of the electromagnetic field of the circularly-polarized wave travelling in this cavity.

For the transmitted energy arriving in the opening 1 of the guide 3, the cavity 21 appears to be positively mistuned and this energy continues towards the opening 2. As the echoes which are due to the isotropic targets arrive in the guide 4 with a rotating field which is the same as that of the transmitted wave, they find the cavity 22 tuned and the cavity 21, through which they cannot pass, mistuned. The echoes due to the anisotropic targets comprise waves that are polarized in the two directions and which, according to their direction of polarization, find the cavity 21 or the cavity 22 mistuned. The result of this is that, when the coil 30 is energized, the energy cannot pass through the circular guide 4.

The radar antenna represented in FIG. 4 profits from the properties which have just been explained. This antenna can rotate about a vertical axis 31 owing to a rotating joint 41. There have been denoted by 40 the chokes which prevent the microwave energy from escaping at the transition of the rotating and steady parts of the joint.

The transmitter 11, as well as one of the receivers 12, are in relation with the antenna through the intermediary of the rectangular guide 32 which is stationary.

The other receiver 13 and a dissipative charge 20 are connected to the coaxial line 33 which is also stationary.

The antenna comprises a folded general guide 34 to which are coupled, through the intermediary of the resonant cavities represented in FIG. 3, a certain number of dielectric radiators 18 in the form of rods. Six of these radiators are represented in FIG. 4. The said guide 34 is connected on one side to the guide 32 and on the other side to the coaxial line 33.

The radiators are arranged substantially in the focal plane of a parabolic mirror 19 and in a vertical plane. If, after reflection on the mirror 19, each radiator produces a beam having an aperture angle of $\alpha$ degrees, the angular spacing between two successive radiators, as seen from the mirror, will be taken as equal to $\alpha$ degrees.

The stub of the circular guide, which comprises two cavities by means of which each radiator is coupled to the guide 34, is represented by a rectangle 35. Represented inside this rectangle is a coil 36 which is merely the diagrammatic representation of the coil 30 with a magnetic core shown in FIG. 3. These coils form the inductances of a delay line, the condensers of which are represented at 37 and which is terminated on its characteristic impedance 38.

According to a first type of operation, all the coils except one are fed and, consequently, all the radiators except one are blocked at the same time to the starting pulses and to the echoes, since at least one of their coupling cavities is mistuned for the carrier wave of the radar. There are therefore, at a given instant, only a single radiator which is transmitting and a single radiator which is receiving.

The delay line is fed by a source of current 39 through the intermediary of the rings and wipers of a collector 42. This source 39 also feeds an electronic valve 43 which receives positive pulses 44 on its control grid. When a positive pulse is applied to the grid of the valve 43, the said valve behaves as a short-circuit and the current is eliminated for a brief instant at the input of the delay line. A pulse represented by an absence of current therefore travels along the line and unblocks the different radiators in succession, none of the coupling cavities of a given radiator 18 being mistuned any longer when the said pulse passes through the coil 36 corresponding to the said radiator.

If the radar, taking its range into account, is transmitting pulses having a recurrence period T, the pulses 44 applied to the valve 43 will have a duration T and a recurrence period equal to the time of delay $\tau$ of the delay line.

If one considers, for example, the case of a radar having a range of 50 kms. and if one takes Number N of radiators = 15
$\alpha = 2°$
$T = \frac{1}{1500}$ sec.

the duration of a vertical scanning will be:

$\tau = NT = \frac{1}{100}$ sec.

If, during this time, the antenna rotates mechanically through 2 degrees round its vertical axis of rotation 31, its revolution will take $\frac{9}{10}$ of a second and, during one revolution, the whole of the sky between the horizon and an elevation angle of 30° will be explored by a succession of solid angles having an angle of 2° at the apex.

According to a second type of operation, it is possible, with the radar of the invention, to survey a zone comprised between a minimum range (100 kms. for example) and a maximum range (150 kms. for example). In this case, as the transmitter always has a recurrence period of $\frac{1}{3000}$ sec., a pulse 45 (FIG. 5) of a few microseconds is applied to the grid of the valve 43, followed, $\frac{1}{1500}$ of a second after, by a pulse 46 of $\frac{1}{3000}$ of a second. In fact, the pulse 45 of a few microseconds allows a transmission pulse to pass, and, during the time of $\frac{1}{1500}$ of a second which follows, the echo can come only from a target situated at least at 100 kms. from the radar. It is only then, and for $\frac{1}{3000}$ of a second, that the echoes from the desired zone arrive. The speed of travel of the signals over the delay line is the same as in the preceding case. The graph of FIG. 5 shows that the nth rod operates as a receiver between the instants in which the $(n+2)$th rod and then the $(n+3)$th rod are unblocked for transmission. From this it is deduced that the depth of the surveyed zone, that is to say the difference between the maximum range and the minimum range, cannot exceed the distance traversed (there and back) by light between two pulses from the transmitter.

However, allowing for the necessary transmission power, this zone can be removed further away through a whole number of distances equal to its maximum depth.

The circular guide of the directional coupler of FIG. 3 comprises two resonant cavities 21 and 22 with an axial core of ferrite, both mistuned by constant magnetic fields applied in opposite directions in order to block the circularly-polarized waves which rotate in the two possible directions according to whether they come from an isotropic obstacle or from an anisotropic obstacle.

The directional coupler of FIG. 6 comprises only a single cavity with a core of ferrite, such that the application of a constant magnetic field to the said core mistunes the cavity at the same time for the two directions of rotation of the circularly-polarized waves capable of passing through it.

The ferrite core which is employed in the present invention is a cylindrical sleeve which covers, in a certain zone, the inside of the wall of the single cavity. In this zone, the microwave magnetic field is parallel to the plane that is tangential to the adjacent wall of the ferrite sleeve. This microwave magnetic field may be regarded as the sum of two components, one of which is perpendicular to the axis of the ferrite sleeve and the other of which is parallel to the same axis.

It is known that, in accordance with standard practice, the component of the microwave magnetic field, that is perpendicular to the axis of the ferrite sleeve, may be regarded as the geometric sum of two magnetic fields of constant and equal amplitudes rotating in opposite directions.

At least one of these rotating magnetic fields is coupled to the movement of precession of the electron magnetic moments that it produces, and the ferrite sleeve is subjected to an axial constant magnetic field, the intenstiy of which is regulated so as to be in the vicinity of ferroresonance. The result of this is a supplementary magnetic energy, and the resonance of the single cavity used can take place only at a frequency which is clearly lower than the value of the resonance frequency that is observed in the absence of the constant magnetic field. Thus, when a constant magnetic field is applied to the ferrite sleeve of the single cavity, no circularly-polarized wave at the carrier frequency of the radar, whatever be its direction of rotation, can pass through the said cavity.

In FIG. 6, 1 and 2 are, as in FIG. 3, the openings of the rectangular guide 3 which communicates, through the opening 1, with the transmitter and the first receiver of the radar and, through the opening 2, with the second receiver.

The guide 3 is coupled to a circular-guide stub 4 by a system of coupling slots 5 and 6. This circular-guide stub constitutes a cylindrical cavity limited by the upper face of the rectangular guide 3 and by a metallic diaphragm 48 having a circular hole 49 at its centre. This cavity 4 has a flange 59 into which a dielectric rod 18 is inserted.

7 is a metallic impedance-matching paddle situated in the guide 3 beneath the longitudinal slot 6. The coupling system 5, 6, 7 is the same as in FIG. 1.

The length of the cavity 4, reckoned along the axis, is such that it vibrates in full wave.

The resonant cavity 4 is covered on the inside, in the vicinity of its central part, by a ferrite sleeve 47. On the other hand, the same central part is surrounded by a ferrite pot 50 which is coaxial with the cavity and has an annular space containing a coil 51.

A direct current may be applied to the terminals 52 of the coil 51. The sections and the visible surface of the ferrite members are dotted in order to distinguish them better.

The ultra high-frequency currents, which exist on the walls of the middle part of the cavity 4, are directed substantially parallel to the axis of the cavity. The sleeve 47 is cut by slits 53 which do not disturb the ultra high-frequency currents but stop the Foucault currents during the transient period of feeding the coil 51 with direct current.

The tuning of the cavity 4 to the frequency of the wave transmitted by the radar transmitter is achieved by energizing the rods 34 of polyethylene when no current is passing through the coil. When this tuning has been obtained, the waves entering through the opening 1 of the rectangular guide 3 are radiated into space in the form of a circularly-polarized wave through the dielectric rod 18, and the echo waves also pass through the cavity 4 and issue through the opening 1 or through the opening 2 according to their direction of circular polarization.

When current is fed into the coil 51, the ferrite sleeve 47 is excited by an axial constant magnetic field. In the vicinity of the sleeve, the ultra high frequency currents, represented by the arrow 55, are axial and the microwave magnetic field, represented by the arrow 56, is perpendicular to the axis of the cavity and parallel to the wall of the latter. This microwave magnetic field 56 can be decomposed into two fields rotating in opposite directions and of constant amplitude, represented by the arrows 57 and 58 and both being perpendicular to the axis.

At least one of the rotating fields 57 and 58 is coupled to the natural precession of the electron magnetic moments due to the constant magnetic field and, in this way, the magnetic energy contained in the cavity 4 increases. This results in a mistuning of the said cavity which no longer allows electromagnetic energy to pass either in the direction of transmission or in the direction of reception, whatever be the direction of rotation of the direction of polarization.

In this way, a single cylindrical cavity renders it possible to block echoes coming from isotropic obstacles and those coming from anisotropic obstacles.

Naturally, it is possible to replace, in the antenna of FIG. 4, the couplers 35 of the type shown in FIG. 3 by the single-cavity couplers of the type shown in FIG. 6.

Of course, the transmitter-receiver set of FIG. 2 may comprise only a transmitter and a single receiver dealing with continuously modulated waves. In this case, the combination of the radiator 18 and the coupler 3—4 constitutes a circularly polarized antenna of the diplex type, i.e. an antenna working simultaneously in transmission and reception and switching in two different channels the transmitted and received waves according to the direction of rotation of their polarization.

What I claim is:

1. An antenna system adapted to transmit and receive circularly-polarized waves of a given carrier frequency and to discriminately switch said waves according to the sense of rotation of their polarization, comprising in combination, a filtering circular polarization directional coupler composed of a stub of rectangular guide having first and second terminals and of a stub of circular guide coupled to the rectangular guide by a system of slots respectively transforming waves propagated in both directions in the rectangular guide stub into circularly-polarized waves rotating in both directions in the circular guide stub, the direction of propagation in the rectangular guide stub and the direction of rotation in the circular guide stub being unambiguously interrelated; at least one cavity resonator, included in said circular guide stub, having a resonance frequency equal to said carrier frequency, ferrite means associated with said cavity-resonator, means for selectively applying constant magnetic fields of opposite directions to said ferrite means and polarizing the same to vary the permeability of said cavity-resonator for said circularly-polarized waves according to the sense of direction of their polarization and a dielectric rod antenna, coaxial with said circular guide stub axis and having asymmetry of revolution about said axis and fitted into said stub just above said cavity-resonator, whereby waves having circular polarization of both senses of rotation received by said dielectric rod antenna are switched towards only a single one of said first and second terminals according to the sense of rotation of their polarization.

2. An antenna system adapted to transmit and receive circularly-polarized waves of a given carrier frequency and to discriminately switch said waves according to the sense of rotation of their polarization, comprising in combination a filtering circular polarization direction coupler composed of a stub of rectangular guide having first and second terminals and of a stub of circular guide coupled to the rectangular guide by a system of slots respectively transforming waves propagated in both directions in the rectangular guide stub into circularly-polarized waves rotating in both directions in the circular guide stub, the direction of propagation in the rectangular guide stub and the direction of rotation in the circular guide stub being unambiguously interrelated, two cavity-resonators included in said circular guide stub, having both a resonance frequency equal to said carrier frequency, cylindrical cores of ferrite in the axis of said cavity-resonators, means for generating constant magnetic fields having directions parallel to the common axis of the cavity-resonators and opposite in each cavity-resonator and a dielectric rod antenna coaxial with said circular guide stub axis and having a symmetry of revolution about said axis and fitted into said stub just above one of said cavity-resonators, whereby, on the application of a magnetic field to the cores, the cavity-resonators are mistuned in relation to the carrier frequency of the waves, one for a circularly-polarized wave having a given direction of rotation and the other for a circularly-polarized wave having the opposite direction of rotation and the dielectric rod antenna is cut off from said first and said second terminals for circularly-polarized waves disregarding the sense of rotation of their polarization.

3. An antenna system adapted to transmit and receive circularly-polarized waves of a given carrier frequency and to discriminately switch said waves according to the sense of rotation of their polarization, comprising in combination a filtering circular polarization direction coupler composed of a stub of rectangular guide having first and second terminals and of a stub of circular guide coupled to the rectangular guide by a system of slots respectively transforming waves propagated in both directions in the rectangular guide stub into circularly-polarized waves rotating in both directions in the circular guide stub, the direction of propagation in the rectangular guide stub and the direction of rotation in the circular guide stub being unambiguously interrelated, a single cavity-resonator included in said circular guide stub having a resonance frequency in full wave vibration equal to said carrier frequency, a sleeve of ferrite coating the inner wall of said cavity-resonator, means for generating a constant magnetic field having a direction parallel to the axis of said sleeve and a dielectric rod antenna coaxial with said circular guide stub axis and having a symmetry of revolution about said axis and fitted into said stub just above said single cavity-resonator, whereby, on the application of the magnetic field to the sleeve, the cavity-resonator is mistuned in relation to the carrier frequency of the waves for the two directions of rotation of the polarization of said waves and the dielectric rod antenna is cut-off from first and second terminals for circularly-polarized waves disregardnig the direction of rotation of their polarization.

4. A lobe scanning antenna system adapted to transmit and receive circularly-polarized waves of a given carrier frequency and to discriminately switch said waves according to the sense of rotation of their polarization, comprising in combination a plurality of filtering circular polarization directional couplers composed of a general rectangular guide having first and second terminals, and of an equal plurality of stubs of circular guide coupled to the general rectangular guide each by a system of slots respectively transforming waves propagated in both directions in the general rectangular guide into circularly-polarized waves rotating in both directions in the circular guide stubs, the direction of propagation in the general rectangular guide and the direction of rotation in the circular guide stubs being unambiguously interrelated, a plurality of pairs of cavity-resonators, the two cavity-resonators of a pair being included in a given circular guide stub, all the cavity-resonators having a resonance frequency equal to said carrier frequency, cylindrical cores of ferrite in the axis of all said cavity-resonators, electromagnetic means corresponding to each pair of cavity-resonators for generating magnetic fields coaxial with said ferrite cores and mistuning at least one pair of cavity-resonators, a plurality of dielectric rod antennae, each coaxial with a given circular guide stub axis and having a symmetry of revolution about said axis and fitted into said stub just above one of the pair of cavity-resonators included in said stub and means for sequentially de-energizing one of said electromagnetic means for tuning the corresponding pair of cavity-resonators, whereby the dielectric rod antennae fitted in circular guide stubs including mistuned pairs of cavity-resonators are cut-off from said first and second terminals for circularly-polarized waves disregarding the sense of rotation of their polarization, and the dielectric rod antenna fitted in the circular guide stub including a non-mistuned pair of cavity-resonators is coupled to said first and second terminals for circularly-polarized waves according to the sense of rotation of their polarization.

5. A lobe scanning antenna system adapted to transmit and receive circularly-polarized waves of a given carrier frequency and to discriminately switch said waves according to the sense of rotation of their polarization, comprising in combinaton a pluralty of filtering circular polarzation directional couplers composed of a general rectangular guide having first and second terminals and of an equal plurality of stubs of circualr guide coupled to the general rectangular guide each by a system of slots respectively transforming waves propagated in both directions in the general rectangular guide into circularly-polarized waves rotating in both directions in the circular guide stubs, the direction of propagation in the general rectangular guide and the direction of rotation in the circular guide stubs being unambiguously interrelated, a plurality of cavity-resonators, each included in a given circular guide stub and all having a resonance frequency in full wave vibration equal to said carrier frequency, sleeves of ferrite coating the inner walls of said cavity-resonators, electro-magnetic means corresponding to each cavity-resonator for generating magnetic fields coaxial with said ferrite sleeves and mistuning said cavity-resonator, a plurality of dielectric rod antennae, each coaxial with a given circular guide stub axis and having a symmetry of revolution about said axis and fitted into said stub just above the cavity resonator included in said stub, and means for sequentially de-energizing one of said electromagnetic means for tuning the corresponding cavity-resonator, whereby the dielectric rod antennae fitted in circular guides stubs including mistuned cavity-resonators are cut off from said first and second terminals for circularly-polarized waves disregarding the sense of rotation of their polarization, and the dielectric rod antenna fitted in the circular guide stub including a non-mistuned cavity resonator is coupled to said first and second terminals for circularly-polarized waves according to the sense of rotation of their polarization.

References Cited in the file of this patent

UNITED STATES PATENTS

| | | |
|---|---|---|
| 2,619,635 | Chait | Nov. 25, 1952 |
| 2,624,002 | Bouix | Dec. 30, 1952 |
| 2,714,707 | Zabel | Aug. 2, 1955 |
| 2,851,681 | Cohn | Sept. 9, 1958 |